Dec. 29, 1953 E. BERLANT 2,664,251

DRIVE FOR MAGNETIC TAPE

Filed Nov. 19, 1948 3 Sheets-Sheet 1

EMMANUEL BERLANT,
INVENTOR.

BY W. E. Beatty

ATTORNEY.

Dec. 29, 1953 E. BERLANT 2,664,251

DRIVE FOR MAGNETIC TAPE

Filed Nov. 19, 1948 3 Sheets-Sheet 2

EMMANUEL BERLANT,
INVENTOR.

BY W. E. Beatty

ATTORNEY.

EMMANUEL BERLANT,
INVENTOR.
BY W. E. Beatty
ATTORNEY.

Patented Dec. 29, 1953 2,664,251

UNITED STATES PATENT OFFICE 2,664,251

DRIVE FOR MAGNETIC TAPE

Emmanuel Berlant, Culver City, Calif., assignor to Berlant Associates, Los Angeles, Calif., a partnership Application November 19, 1948, Serial No. 60,896

5 Claims. (Cl. 242—55)

The invention relates to a drive for magnetic tape employed for recording or reproducing sound, particularly in a dictaphone type of machine.

An object of the invention is to simplify and improve the drive employed for reeling or unreeling the tape.

The invention particularly relates to magnetic paper tape and for a dictaphone type of machine employing this medium; it has heretofore been proposed to employ several motors in order to drive the supply and take-up reels at a comparatively low speed for recording purposes or at a high speed for rewinding purposes.

An object of the invention is to provide an improved drive making it possible to employ a single motor for driving the supply and take-up reels under high or low speed conditions.

A further object of the invention is to provide an improved, compact chassis mount for the drive.

A further object is to provide an improved mount for the motor for varying its driving relation with its driven element.

A further object is to provide an improved clutch device for propelling the tape or for stopping it without overrunning, while the motor remains in operation.

The invention provides an improved drive wherein the motor, reel, spindles as well as the drive and controls therefor are all mounted on a chassis which is suspended from the underside of the top of a casing, the casing having provisions for the supply and take-up reels and various controls for the equipment.

For further details of the invention reference may be made to the drawings wherein Fig. 1 is a perspective view of a dictaphone type of machine having the drive for magnetic tape according to the present invention.

Figure 1:
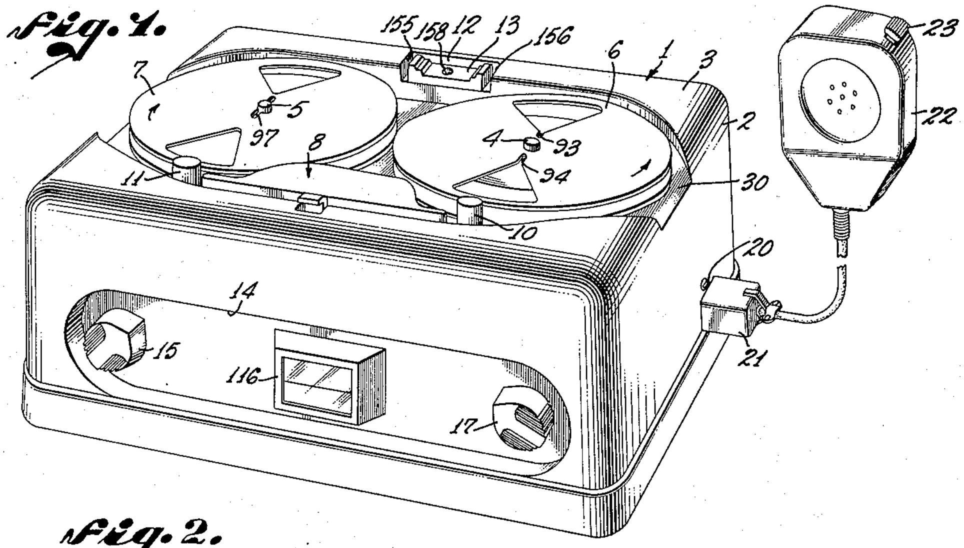

Referring in detail to the drawings, the drive for magnetic paper tape according to the present invention is illustrated as applied to a dictaphone type of machine 1 having a casing 2. The top 3 of casing 2 has a depressed top 30 from which upwardly project the spindles 4 and 5 for the supply reel 6 and take-up reel 7, respectively. Between the reels 6 and 7 is a head 8 for recording sound onto or reproducing it from the magnetic paper tape 9. Head 8 has a magnetic recorder 107, an eraser 108. The tape on leaving the supply reel 6 passes around the front of a smooth drive spindle 10 across the rear of a guide post 105, see Fig. 2, then through the head 8, across the rear of a guide post 106, and around the front of the smooth drive spindle 11 to the take-up reel 7.

The casing 2 has a recess 12 in which is slidably mounted a knob 13 operable to drive either reel 6 or 7 at high speed for re-wind purposes.

Figure 7:
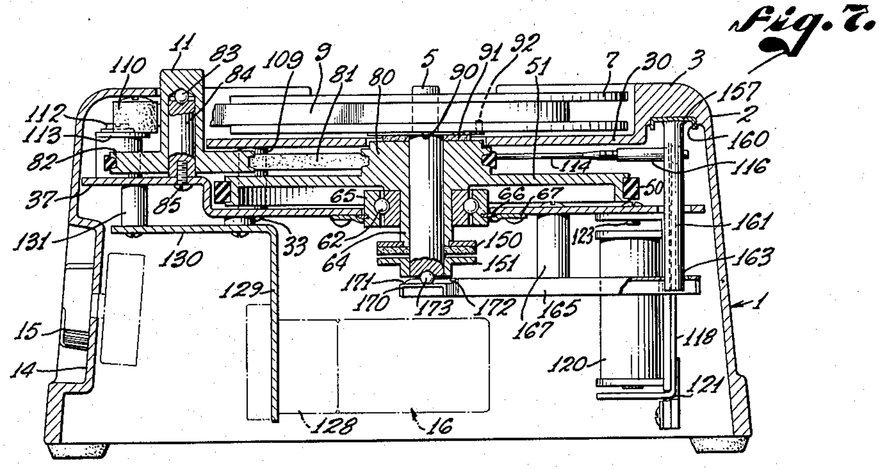
Fig. 7 is a sectional view on line 7—7 of Fig. 6 looking in the direction of the arrows.

The front of the casing 2 has a recessed panel 14 having a switch 15 to connect an amplifier indicated at 16 in Fig. 7 for recording or reproduction as shown by the indicator 116. The panel 14 also has a volume control switch 17.

The details of the amplifier 16 and its circuit controlled by selector switch 15 and volume switch 17 form no part of the present invention.

The casing 2 has an electrical socket 20 for a plug 21 connected to a combined microphone and speaker 22 having a switch 23. While it is old to use a switch like 23 on the element 22, the thing which is controlled by switch 23 is a part of the present invention and will be described later.

The socket 20 is also adapted to receive a plug 24 connected to a socket 25 and to a foot control switch 26. Socket 25 is adapted to receive a plug 18 to which an earphone 19 is connected.

Figure 5:
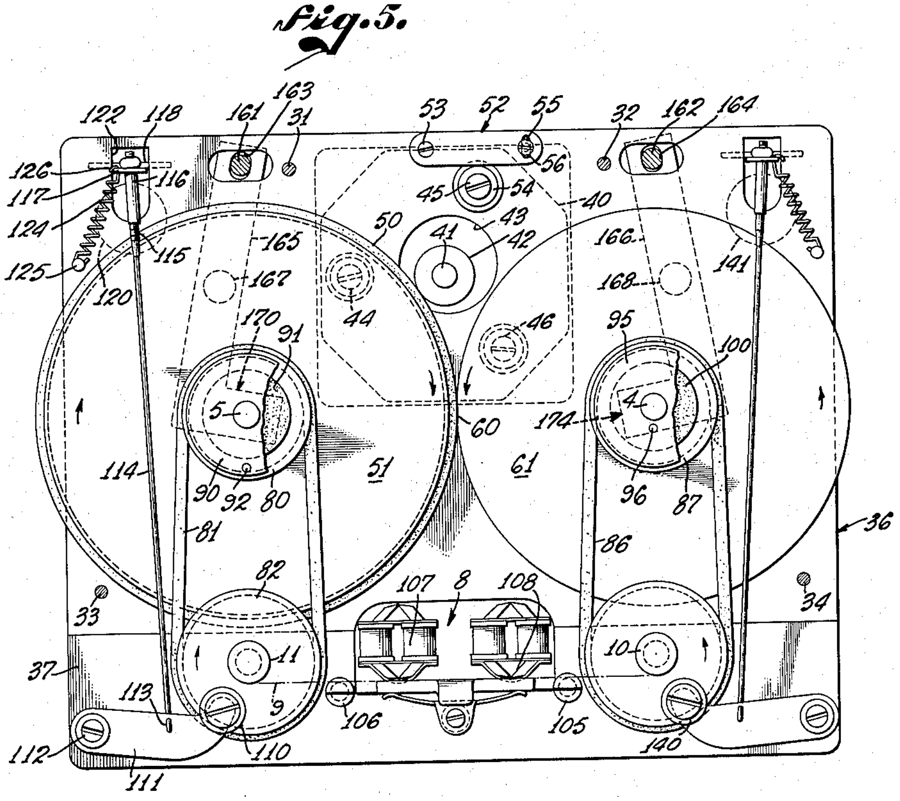
Fig. 5 is an enlarged plan view of the top of the chassis, with the casing removed.
Figure 6:
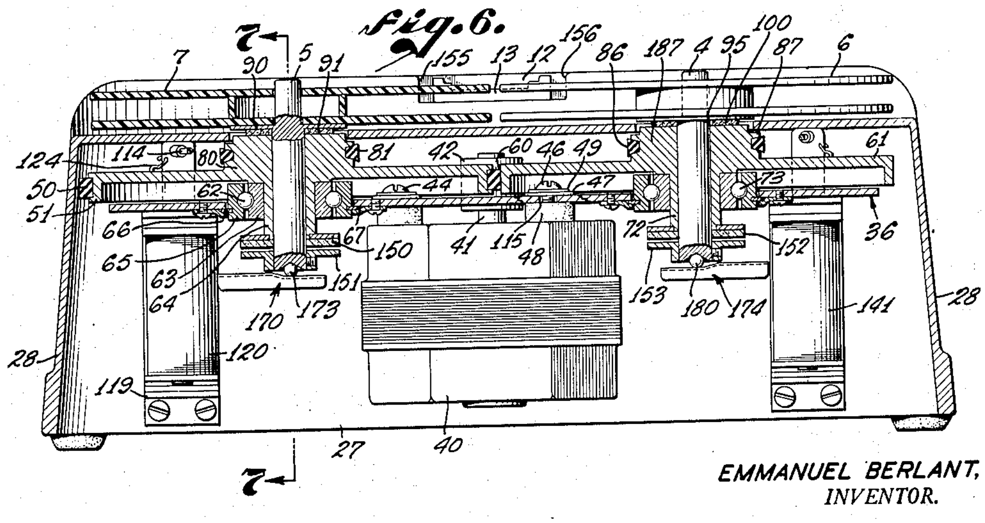
Fig. 6 is a sectional view on line 6—6 of Fig. 2 looking in the direction of the arrows.

As shown more particularly in Figs. 6 and 7, the casing 2 has an open bottom 27 with downwardly and outwardly sloping sides 28. Mounted inside of the casing 2 and suspended therefrom by four screws 31, 32, 33, 34, see Fig. 5, is a chassis 36 in the form of a generally horizontal plate having a raised portion 37 across its front. All of the elements of the drive are mounted on the chassis 36 and the casing 2 can be removed from it by removing the screws 31 and 34.

As shown in Fig. 7, the chassis 36, 37 is suspended by the screws 31 to 34 in spaced relation from and below the top 3 of the casing. For this purpose, the screws 31 to 34 have suitable spacers, one of which is indicated at 109 in Fig. 7, or such spacers may be in the form of elongated bosses cast integral with the under side of the casing top 3.

The drive employs a single motor indicated at 40 in Fig. 6 and shown by the octagonal broken line 40 in Fig. 5. The motor 40 has a drive shaft 41 which extends vertically and provided with a friction pulley 42 which projects through a hole 43 in the chassis 36, the motor 40 itself being arranged below the chassis 36 and suspended therefrom by three screws 44, 45, 46. As will appear from Fig. 6, screw 46 passes through an enlarged opening 115 in the chassis 36 and around it is an upper rubber washer 47 on top of chassis 36 and a lower rubber sleeve 48 between the top of the motor 40 and the under side of chassis 36. Screw 46 is screwed down to clamp the upper rubber washer 47 between washer 49 and the chassis 36 and to clamp the lower sleeve 47 between the motor 40 and the chassis 36, thereby providing a cushion mount for the motor 40 which is capable of lateral movement as the other bolts 44, 45 are similarly arranged, and each hole like 115 for the bolts 44 to 46 is larger than such bolts. This makes it possible to laterally shift the pulley 42 and adjust its frictional contact with a friction band 50 on a flywheel 51. The pulley 42 may be thus laterally adjusted by means of a lever 52 pivotally supported on the chassis 36 as indicated at 53, lever 52 bearing at its intermediate portion on the washer 54 for screw 45. The outer end of lever 52 is held in adjusted position by a screw 55 having a cooperating slot 56 in the lever 52.

The friction surface 50 on the flywheel 51 is in driving engagement as indicated at 60 in Fig. 5, with the edge of flywheel 61 which is of the same size as the flywheel 51. The flywheels 51 and 61 therefore are rotated in opposite directions by pulley 42. Flywheels 51, 61 and pulley 42 have parallel vertical axes.

As shown in Fig. 6, flywheel 51 is mounted in a ball bearing 62 having an inner race 63 connected with the downwardly extending hub extension 64 of the flywheel 51. The ball bearing 62 has an outer race 65 having a split ring 66 which is clamped to the under side of the chassis 36 by suitable clamps 67.

The flywheel 61 similarly has a downwardly extending hub 72 mounted in a ball bearing 73 mounted in the chassis 36.

The flywheel 51 has an upper hub 80 serving as a pulley and having a belt 81 which passes around a pulley 82. As shown in Fig. 7, pulley 82 is at the base of the dead end hollow spindle 11 which drives the tape 9 at certain times. Spindle 11 is rotatably supported on a ball 83 and post 84, the latter arising from the elevated chassis portion 37 and being secured thereto by a screw 85.

The tape spindle 11 rotates in the same direction as the flywheel 51, for example, in a clockwise direction as shown by the arrows in Fig. 5, while the tape spindle 10 and flywheel 61 rotate in the opposite direction. Tape spindle 10 is supported and driven in a manner similar to that above described for spindle 11, being driven by a belt 86 around the pulley 87 on the upper hub 187 of the flywheel 61.

As shown in Fig. 7, the hub 64, 80, of flywheel 51 is hollow, providing a bearing support for the reel spindle 5. Spindle 5 has a collar 90 fixed thereto, this collar resting by gravity on a felt disk 91 suitably secured to the top of the hub 80. The collar 90 has a pin 92 at a comparatively great distance from the spindle 5, to receive one or the other of the notches 93, 94, see Fig. 2, in the reel 6 when it is turned over and placed on a spindle 5, while a similar collar 95, see Fig. 5, on the spindle 4 has a pin 96 comparatively close to the spindle 4 to receive a notch 97, see Fig. 2, when the reel 7 is turned over and placed on the spindle 4, thereby insuring that at the end of recording, with reel 6 empty and reel 7 full, reel 7 will have to be turned over to fit on spindle 4 thereby insuring that the recording will be applied to the fresh half of the tape.

A similar friction drive for reel 6 is provided as spindle 4 is journaled in the hub 72, 187 of pulley 61. Also spindle 4 has a collar 95 which rests on a friction felt disk 100 secured to the top of the hub 87.

Figure 2:
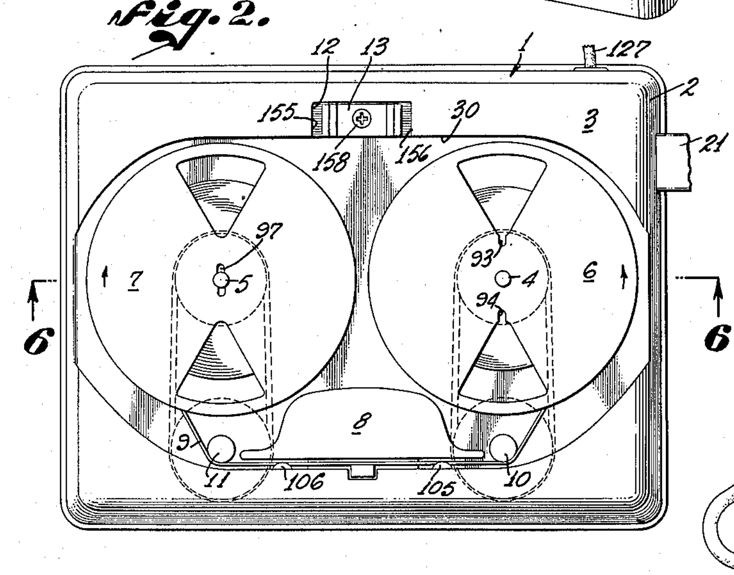
Fig. 2 is a plan view of the machine of Fig. 1 with the combined microphone and soft speaker removed.

Assuming that reels like 6 and 7 are in position on the machine with tape 9 threaded as shown in Fig. 2, with motor 40 running, the flywheels 51 and 61 and the spindles 10 and 11 will rotate in opposite directions, but the tape will remain stationary for the reason that the tendency of the hub of flywheel 51 is to rotate its reel 7 in one direction through the slipping friction coupling 90, 91 which is equal and opposite to the tendency of flywheel 61 to rotate its reel 6 through slipping friction coupling 95, 100 in the opposite direction. This keeps the tape 9 taut in the head 8 and prevents it from overrunning when the moving tape is stopped. The force exerted by the slipping or dragging friction coupling just described on the tape is, of course, less than the strength of the tape.

In order to propel the tape from either reel 6 or 7 to the other, at a slow speed for recording purposes and at a high speed for rewind, the following arrangement is provided.

Figures 8, 9, 10:
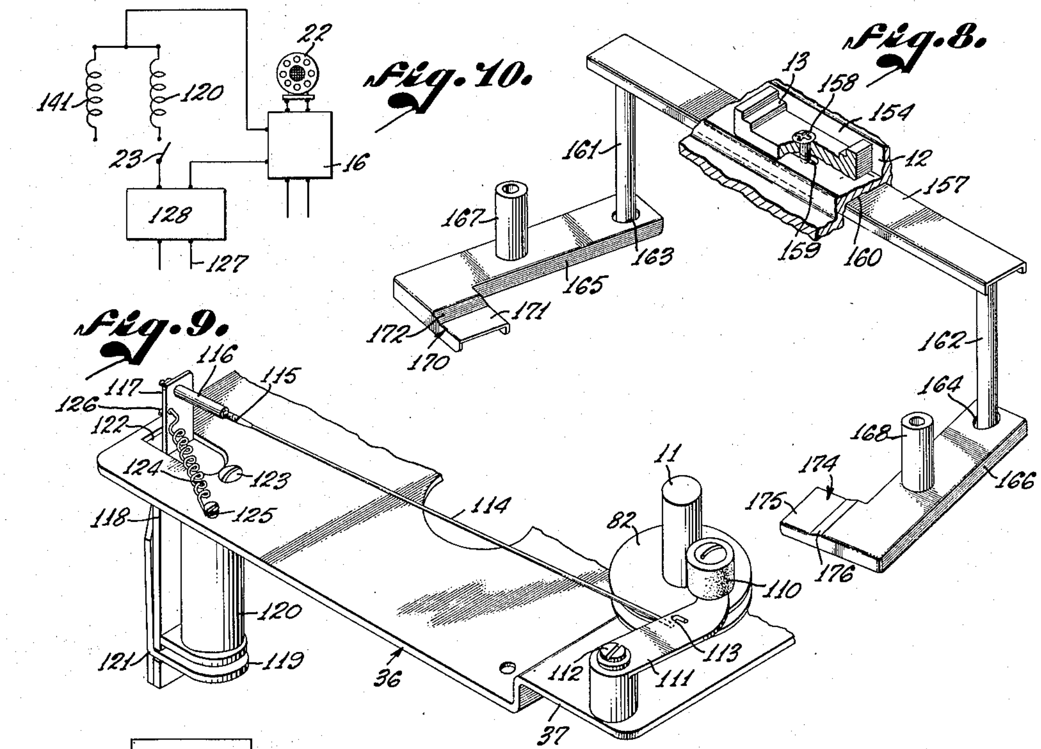
Fig. 8 is a perspective view of the rewind control detached from associated apparatus and partly in section.
Fig. 9 is a perspective view of a portion of the tape drive control with parts broken away.
Fig. 10 is a schematic circuit of the microphone switch control.

*Slow speed.*—The tape 9 is propelled at slow speed from reel 6 to reel 7 by operating the idler pulley 110, see Figs. 5 and 9, to press the tape into drive engagement with the tape spindle 11, assuming motor 40 is running. The rotative effort of reel 7, plus the rotative effort of the spindle 11 when acted on by the pulley 110 of course overcomes the drag of the friction pad 100 on the other reel 6. Pulley 110 is at one end of a lever 111, the other end thereof being pivotally supported on the elevated chassis portion 37, as indicated at 112. Secured to an intermediate portion of the arm 111, as indicated at 113 is a rod 114 which extends above the flywheel 51 to the rear of the chassis 36 and terminating in a screw 115 fitting in a socket 116 secured to the upper end 117 of a vertical arm extension 118 on the horizontal armature 119 of a magnet or solenoid 120. Armature 119 is pivotally supported as indicated at 121 and the extension 118 passes through an aperture 122 in the chassis 36. The coupling 115, 116 makes it possible to adjust the effective length of the rod 114 and, hence, the position of the pulley 110. The magnet 120 is suspended from the under side of chassis 36 by a screw 123. The armature 119 is urged to idle position, with pulley 110 also idle, by a spring 124 connected at one end 125 to chassis 36 and connected at the other end 126 to the extension 117.

Magnet 120 may be operated by microphone switch 23 over an obvious circuit shown in Fig. 10. The cord for connection to a power supply is shown at 127 in Fig. 2. The amplifier 16 shown in Fig. 7 and associated rectifier 128 are suitably supported from the vertical arm 129 of an angle bracket having a horizontal portion 130 suspended from chassis portion 37 by screws and spacers as indicated at 131 in Fig. 7.

Figure 4:
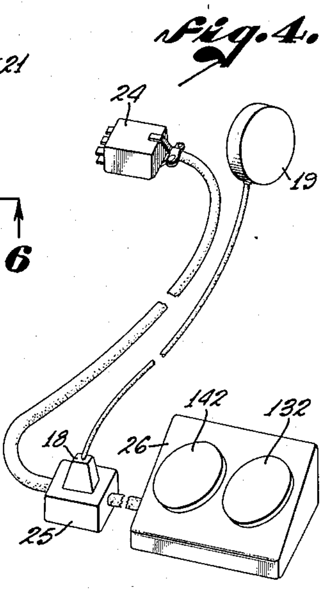
Fig. 4 is a perspective view of a foot switch and microphone control.
Figure 3:
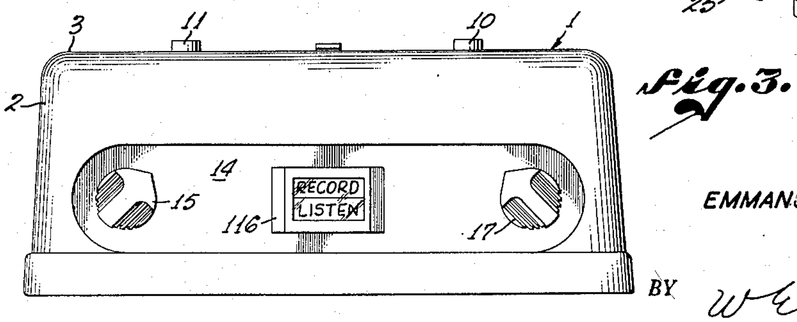
Fig. 3 is a front view in elevation of a machine of Fig. 1 with the combined microphone and soft speaker removed.
Figure 11:
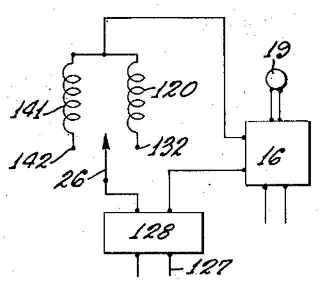
Fig. 11 is a schematic circuit of the foot switch control.

As shown in Fig. 11, the magnet 120 may be operated by the pedal 132 of the foot switch 26 shown in Fig. 4.

For slow speed drive of the tape 9 in the opposite direction from reel 7 to reel 6, the idler pulley 140 is similarly operated by a magnet 141 to press the tape 9 into driving engagement with the spindle 10. The mechanical connection between the magnet 141 and the pulley 140 is the same as described for pulley 110. Magnet 141, as shown in Fig. 11, may be operated by the foot pedal 142 of the foot switch 26, see also Fig. 4.

*High speed.*—As shown in Fig. 6, both of the reel spindles 4 and 5 are slidably supported in their respective flywheels 61 and 51 and either of them may be raised slightly to disengage them from their respective friction pads 100 and 91, to directly connect them to their respective flywheels as follows. As shown in Figs. 6 and 7, fixed to the lower end of hub 64 is friction disk 150 having a cooperating clutch plate 151 fixed to spindle 5. Similarly, fixed to the lower end of hub 72 is a friction disk 152 having a cooperating clutch plate 153 fixed to the lower end of spindle 4. Raising either one of the spindles 4 or 5 will disengage it from its respective felt pad 100 or 91 and directly couple it to its respective flywheel 61 or 51 through the clutch just described.

The spindles 4 and 5 are raised one at a time for this purpose by operating the sliding knob 13. As shown in Figs. 1, 2, 6 and 8, knob 13 is slidably supported on top of the bottom 154 of a depressed casing portion having end walls 155, 156 to limit the movement of the knob 13. Below the casing portion 154 is a cross arm 157 supported from knob 13 by a screw 158 which is guided for reciprocating movement by a slot 159 in the casing portion 154. Arm 157 extends along the back of and underneath the top 3 of casing 2 and is an inverted U-channel guided in a channel 160 under the top 3 of the casing as shown in Fig. 7. Crossarm 157 at its opposite ends has depending arms 161, 162 which extend into the holes 163, 164 respectively at one end of the cam levers 165, 166. As shown in Fig. 7, the lever 165 is suspended in spaced relation below the chassis 36 by a screw and spacer indicated at 167 and lever 166 is similarly supported, the spacer therefor being indicated at 168 in Fig. 8. Lever 165 has a cam 170 having a dwell or horizontal portion 171 and an incline or raise 172. When knob 13 is moved to the left as shown in Fig. 8, the cam 170 is moved to the right to cause the incline 172 to act through a ball 173 and raise the spindle 5 to operate the clutch 150, 151 as above described. Arm 166 has a similar cam 174 having a horizontal portion 175 and a raised portion 176. When knob 13 is in its intermediate position, as shown in Fig. 6, both spindles 4 and 5 are in their lower position with their respective clutches 152, 153; 150, 151 open and with ball 173 on the dwell 171 and with a corresponding ball 180 for spindle 4 on the dwell 175. The raise 172 slopes upwardly in a direction to the left while the raise 176 slopes upwardly in a direction to the right and, hence, the knob 13 may be moved in one direction or the other to operate the cams 170, 174 one at a time.

When the knob 13 is operated to operate one of the reels 6 or 7 at high speed, when again shifting the knob 13 to intermediate position to lower the previously raised spindle, its corresponding reel immediately stops revolving, without overrunning, due to the friction of the felt pads 91 and 100 which revolve in opposite directions. For the same reason, overrunning is prevented for low speed operation.

Various modifications may be made in the invention without departing from the spirit of the following claims. For example, the slow speed reverse drive spindle 10 and associated parts may be omitted, as the reverse travel of the tape from reel 7 to reel 6 may be effected at high speed by operating knob 13. Also the high speed forward drive 150, 151 and associated parts may be omitted. Also the wheels 51, 61 do not need to run at exactly the same speed, as they operate on the reels 6, 7, through friction drags 91, 100 and the main requirement is that the torque of one drag should not be different from the other by an amount sufficient to cause the reels 6, 7 to rotate when the motor 40 is operating, with pulleys 110, 140 idle.

I claim:

1. A drive comprising a pair of counterrotating wheels arranged edge to edge in driving relation, a motor having a pulley in driving relation with the edge of one of said wheels, a reel spindle coaxial with and journaled in each of said wheels, a frictional drag between each of said wheels and its respective spindle, a drive spindle in a tape path between said wheels, means for driving said drive spindle from one of said wheels, an idler pulley for said drive spindle, and means for operating said idler pulley.

2. A drive for magnetic tape, said drive comprising a wheel, means supporting said wheel for rotation about a substantially vertical axis, said wheel having a hub, a reel spindle slidably and rotatably mounted in and coaxial with said hub, said hub having an upper end having a friction pad, said spindle having a disk adapted to rest at times on said pad, said hub having a lower end having an upper clutch element thereon, a cooperating lower clutch element on said spindle, said clutch elements being separated when said disk is on said pad, and means for raising said spindle to engage said clutch elements and disengage said disk from said pad.

3. A drive comprising a pair of counterrotating wheels arranged edge to edge in driving relation, a motor having a pulley in driving relation with the edge of one of said wheels, a reel spindle coaxial with and journaled in each of said wheels, a reel on each of said reel spindles, a clutch and drag connection between each of said wheels and its respective reel, a pair of drive spindles in a tape path between said reel spindles, means for driving each of said drive spindles from one of said wheels, an idler pulley for and adjacent each of said drive spindles and shiftably mounted for movement toward and away from its drive spindle with said tape therebetween, and means to selectively shift each of said idler pulleys to effect tape driving engagement with its adjacent drive spindle.

4. A drive according to claim 3 wherein the drag connection of one of the reels is effective in a counterdirection to the movement of the tape to keep the tape taut when the tape is being driven by the other reel.

5. A friction drive for propelling magnetic tape from one reel to another, said drive comprising an axially shiftable spindle for each of said reels, oppositely rotating drive wheels, one for each of said reels and spindles, respectively, a friction clutch and drag connection between each of said wheels and its reel effective to cause said reels to remain stationary when said spindles are in operation, with said tape taut between said reels, and means operatively associated with the respective wheel spindles effective to pull the tape in the direction of its associated drive wheel reel and overcome the drag connection of the other wheel and its reel, said clutch and drag connection comprising a clutch having one element connected to one of said spindles and another element connected to its said wheel, said last mentioned wheel having a bearing supporting its spindle for reciprocating movement to one position with said clutch open and its said drag effective and to another position with said clutch closed and said drag ineffective, and means for axially moving said last mentioned spindle.

EMMANUEL BERLANT.

References Cited in the file of this patent

UNITED STATES PATENTS

| Number | Name | Date |
|---|---|---|
| 1,155,776 | Washburn | Oct. 5, 1915 |
| 2,071,192 | Younts | Feb. 16, 1937 |
| 2,304,913 | Herzig | Dec. 15, 1942 |
| 2,365,691 | Fodor | Dec. 26, 1944 |
| 2,369,017 | Camras | Feb. 6, 1945 |
| 2,408,320 | Kuhlik | Sept. 24, 1946 |

FOREIGN PATENTS

| Number | Country | Date |
|---|---|---|
| 459,035 | Great Britain | Dec. 31, 1936 |